United States Patent

Baermann

[11] 4,055,824
[45] Oct. 25, 1977

[54] SWITCHABLE PERMANENT MAGNETIC HOLDING DEVICES

[76] Inventor: Max Baermann, 506 Bensberg, Bezirk, Cologne, Germany

[21] Appl. No.: 676,135

[22] Filed: Apr. 12, 1976

[30] Foreign Application Priority Data

Apr. 12, 1976 Germany .............................. 2517364

[51] Int. Cl.² .............................................. H01F 7/02
[52] U.S. Cl. ..................................... 335/288; 335/295
[58] Field of Search ................. 335/284, 288, 295, 306

[56] References Cited

U.S. PATENT DOCUMENTS

| 3,184,654 | 5/1965 | Bey ...................................... 335/295 |
| 3,223,898 | 12/1965 | Bey ...................................... 335/295 |
| 3,812,629 | 5/1974 | Campbell .......................... 335/295 X |

FOREIGN PATENT DOCUMENTS

| 847,394 | 9/1960 | United Kingdom ................. 335/295 |
| 829,101 | 2/1960 | United Kingdom ................. 335/295 |

Primary Examiner—George Harris
Attorney, Agent, or Firm—Meyer, Tilberry & Body

[57] ABSTRACT

A permanent magnet energized holding device, which has a maximum holding power for a given volume of magnetic material, can be readily switched on and off with a minimum of force. At least two pairs of plate-shaped poleplates are provided with a permanent magnet arrangement sandwiched in between. Each pair of poleplates are separated by a non-magnetic medium. The permanent magnet arrangement consists of a fixed magnet, having a circular opening, and a disc shaped magnet rotatable in the opening. The two magnets are magnetized in the direction of their smallest dimension with portions of each having opposite magnetic polarity. The portions of the stationary magnet are arranged to magnetize the pole plates with opposite magnetic polarity. The disc shaped magnet, in one position, has magnetic polarity which coincides with that of the stationary magnet and reinforces its magnetic force and in another position, has magnetic polarity in opposition to the magnetic polarity of the fixed magnet whereby to oppose and reduce the flux in the pole-plates.

7 Claims, 5 Drawing Figures

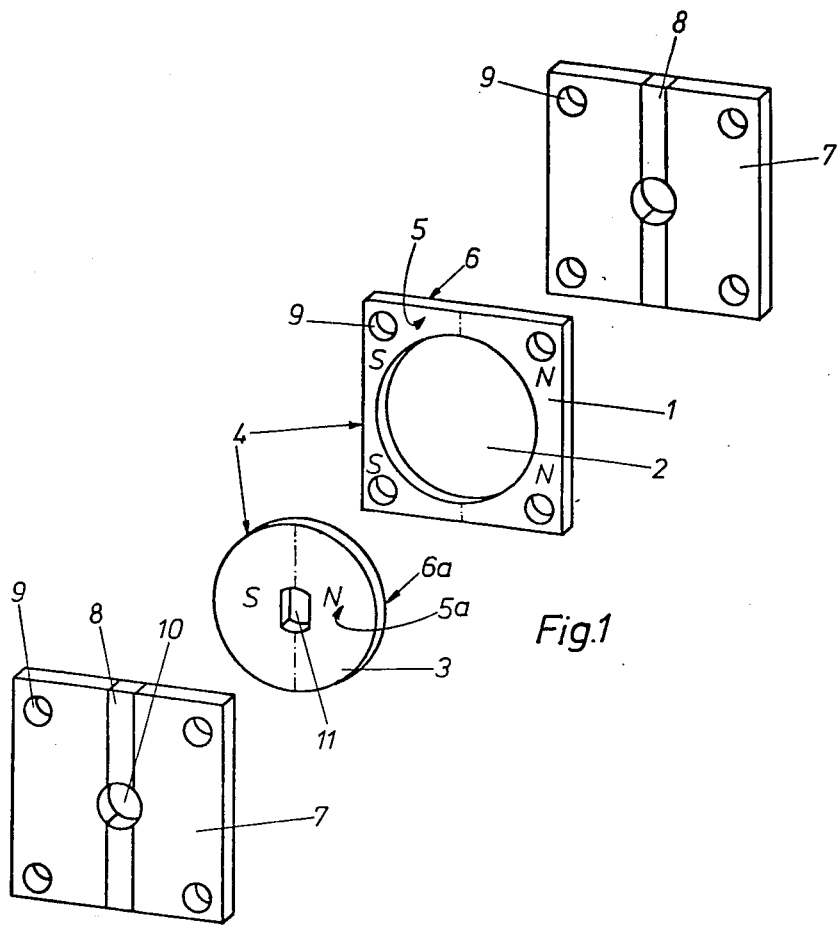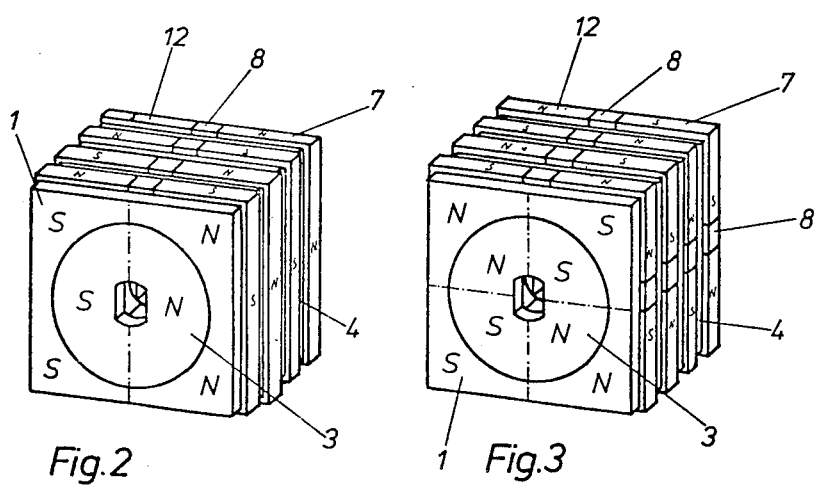

SWITCHABLE PERMANENT MAGNETIC HOLDING DEVICES

This invention relates to a switchable permanent magnetic holding device for holding ferromagnetic objects such as work-pieces.

Switchable magnetic systems having two magnet arrangements which may be displaced towards one another by at least one pole pitch are already known. Each of these magnet arrangements comprises a number of plate-shaped permanent magnets, preferably of an oxide ceramic material, which are magnetized in the direction of their smallest thickness, and plate-shaped pole shoes of a material with high permeability such as soft iron, which are arranged between the individual magnets. One arrangement is facing the other arrangement in such a manner that the poles of the plate-shaped pole shoes, wherein due to the dimensions of these pole shoes the lines of magnetic force are strongly concentrated, are of the same polarity so that a strong exterior magnetic field is available for holding ferromagnetic objects. By displacing one of the magnet arrangements in relation to the other by at least one pole pitch, poles of different polarity will face each other so that the magnet system is short-circuited by the pole shoes and the exterior field practically disappears.

Magnetic systems of this kind may be bar-shaped and displacable towards one another in a straight line; however, they may also be designed as rings and in a way that they can be turned towards one another (German Patent Specification No. 1,088,625).

With this known magnet arrangement the plate-shaped pole shoes and the intermediate plate-shaped permanent magnets, both constituting one unit, have to be displaced towards one another. Due to this construction, the displacement of one magnet arrangement towards the other one requires relatively high forces, because by reason of the great density of the lines of magnetic force the holding forces between the adjacent narrow sides of the pole shoes of both arrangements are very high.

Also known is a magnetic holding device with permanent magnets where lower switching forces are required for switching the system on and off. This magnetic holding device comprises plate-shaped pole shoe pairs made of a material with high permeability, with a non-magnetic medium such as air existing between each pair of pole shoes. This magnetic holding device further consists of at least two permanent magnets which are magnetized in the direction of their smallest thickness and are arranged between the plate-shaped pole shoe pairs. These magnets are preferably made of a permanent magnet material such as barium ferrite and are in face-to-face contact with the plate-shaped pole shoe pairs. Between the stationary pole shoe plates, one row of these successively arranged permanent magnets is displaced towards the other row by one pole pitch. In one position, the magnetic holding device is switched on, as poles of same polarity in the two rows of permanent magnets are aligned with each pole shoe plate, whereas in switched-off position, one north pole and one south pole are aligned with each pole shoe plate so that the lines of magnetic force emanating from the poles are short-circuited through the plate with high permeability. (German Patent Specification No. 2,304,818).

A disadvantage of that known arrangement of a switchable permanent magnetic holding device is that in the one switching position the space between the pairs of pole shoe plates at both ends of the holding device is not completely filled with permanent magnet material, a fact which is due to the displacement of the permanent magnet rows by one pole pitch. Thus, a lower magnetic attractive force results at both ends of the holding device.

The present invention aims at creating a switchable permanent magnetic holding device for holding ferromagnetic objects, in which, by making optimal use of the magnet material, the space between the plate-shaped pole plates may always be completey filled with permanent magnet material, both in switched-on and switched-off position, and which permits a high attractive force across the whole adhesive surface and also makes possible an economical assembly requiring only low switching forces.

To this end, the invention of a switchable permanent magnetic holding device for holding ferromagnetic objects such as workpieces comprises at least two pairs of plate-shaped pole plates made of a material with high permeability, with each pair of pole plates being separated by a non-magnetic medium, and two permanent magnets arranged between each pair of plates and magnetized in the direction of their smallest thickness, with at least one of the permanent magnets being movable relative to the other one, characterised in that the stationary permanent magnet is in the form of a flat plate of permanent magnet material having a circular opening there through, the moveable magnet is in the shape of a circular disc of permanent magnet material and rotatable in the opening with both each stationary and each rotatable magnet having at least two pairs of poles of opposite magnetic polarity. The stationary permanent magnet poles are so arranged that one pair of poles magnetizes a pole plate of each pair of plates. The rotatable magnet poles are so arranged that in one position of rotation the poles magnetises a pole-plate of each pair to reinforce that of the stationary magnet and in the other position neutralize or oppose that of the stationary magnet whereby the holding device is switched on or off respectively.

By virtue of this arrangement of the rotatable magnet within the circular opening of the stationary magnet according to the invention, a maximum volume of permanent magnet material is provided between the pole plates despite the relatively small overall height of each magnet arrangement. Furthermore, all lines of magnetic force emanating from the pole faces of the permanent magnets are taken up by the pole plates because the side of the latter face the permanent magnets with their total surface. Thus, a maximum attractive force is achieved with an economical construction.

The arrangement according to the invention also renders it possible to obtain an infinitely variable switching-off and -on of the system although only relatively low displacing forces are required because none of the elements of the holding device, which are affected by a high-density of the lines of magnetic force, have to be moved towards or away from each other.

If permanent magnet materials with same magnetic properties are used for both the rotatable and stationary magnet, it is convenient for completely switching the holding device off to provide a pole face area for each of the rotatable magnets that is 10% greater than the face of each stationary magnet.

If the induction of the magnet material used for the rotatably magnet is higher than that of the material used for the stationary magnet, the rotatable magnet may have a smaller pole surface in proportion to its higher density of lines of magnetic force.

In an advantageous embodiment of the invention, the permanent magnets which consist of a stationary and rotable part, may be arranged with the parts of high permeability adhering to their pole faces in any number, one after the other in the direction of their axis rotation, depending on the holding force desired. In that case the lower part of the pole plates may be fastened to a non-magnetic base plate. Each of the individual units consisting of one set of permanent magnets and the pole plates covering the pole surfaces, may also be held together by fixing screws; in that case the base plate may be dispensed with. For holding the aforementioned units together, also adhesives may be used. For the purpose of displacing, the pole plates and the disc-shaped permanent magnets are provided with an actuating handle.

In another advantageous embodiment the permanent magnet arrangements and the pole plates of high permeability adhering to the pole faces of the permanent magnets may be arranged side by side in a direction perpendicular to the axis of rotation, with the transmission of the rotary motion towards the individual turnable magnets being effected through an intermediate gear.

For fastening the individual elements, a base plate may be provided again, in which the individual pole plates are fastened with their lower parts. Thus a holding device of great length is obtained.

In order that the invention may be more readily understood, reference is made to the accompanying drawings, which illustrate diagrammatically and by way of example, several embodiments thereof and in which:

FIG. 1 is a perspective view of one unit of the holding device that is expanded in axial direction;

FIG. 2 is a perspective view of a holding device that is composed of several units, with each stationary and turnable magnet having poles alternating in axial direction;

FIG. 3 is a perspective view of the same holding device as illustrated in FIG. 2, but with each stationary and turnable permanent magnet having four pole pairs alternating in axial direction;

Figure 4:
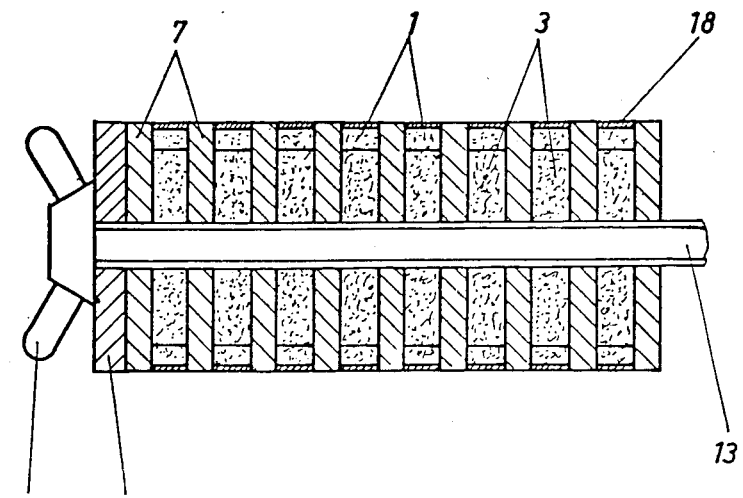
FIG. 4 is a vertical axial section of the holding device according to the embodiment shown in FIGS. 2 and 3; and, FIG. 5 is a perspective view of the holding device, with the adjacent permanent magnet arrangements in perpendicular direction to the axis of rotation and the pole plates of high permeability adhering to the pole faces of the permanent magnet arrangements.

One unit of the permanent magnetic holding device according to FIG. 1 consists of a plate-shaped stationary permanent magnet 1 which is provided with a circular opening 2. A disc-shaped rotatable permanent magnet 3 is arranged within that opening. The plate-shaped permanent magnet 1 and the disc-shaped permanent magnet 3 have the same thickness so that they form a permanent magnet arrangement 4 which is provided with plane surfaces 5 and 5a and 6 and 6a, respectively.

As it is obvious from the drawing by means of the inserted letters N and S. the stationary and the rotatable permanent magnet are so magnetized that they each have two pole pairs, the polarity of which alternates in axial direction. In this embodiment the poles are divided by a dotted parting line (neutral zone).

Where a south pole and north pole, respectively, is situated on the illustrated pole faces 5 and 5a of the permanent magnets, the respective opposite pole is provided on the pole face 6 and 6a.

Preferably, the permanent magnet arrangement is composed of an oxide ceramic material such as barium-, strontium-, or lead ferrite. The permanent magnet material may either be sintered or, in powdered condition, be mixed with a plastic binder and thereafter be pressed or injection-moulded.

In addition there are provided two sets of pole plates 7 of high magnetic permeability which, according to the separation of the premanent magnet arrangement, are subdivided into two areas by means of a non-magnetic medium 8 such as air brass or aluminum.

The thus formed two pole plates are aligned with the pole faces 5 and 6 of the permanent magnet arrangement 4. Both the pole plates 7 of high permeability and the plate-shaped stationary permanent magnet 1 are provided with bores through which the non-ferromagnetic fixing screws (not illustrated) are guided in order to connect the whole unit as a solid body. The pole plates of high permeability lying upon the pole faces of the permanent magnet arrangement collect the lines of magnetic force which emanate from the lateral surfaces of the pole faces in high concentration due to the small dimensions of the lateral surfaces so that a strong exterior field is available for holding ferromagnetic objects.

In the chosen embodiment the permanent magnet arrangement is shown in a position in which the holding device is in switched-on condition. Poles of same magnetic polarity of the stationary and rotatable permanent magnet are in this condition positioned adjacent to one half of the pole plates 7. By turning the disc-shaped permanent magnet 3 by 180°, there will then be a north pole of the stationary plate and a south pole of the rotatable disc-shaped permanent magnet in one pole area. In this position of switching, the lines of magnetic force meanating from the poles are short-circuited by the pole plates of high permeability so that the holding device is in switched-off position. With a displacement by an angle of less than 180°, it is possible to alter the attractive force of the holding device in an infinitely variable way.

For the purpose of turning the disc-shaped permanent magnet 3, the pole plates 7 of high permeability are — just as the permanent magnet 4 — provided with a central recess 10 and 11. The recess 11 of the disc-shaped permanent magnet may be of an elongated or square shape. A turning shaft (not illustrated in the drawing) for turning the disc-shaped permanent magnets is guided through the central recesses 10, 11.

As it is obvious from FIG. 2, a number of the component parts illustrated in FIG. 2 is successively assembled in axial direction as a cube-shaped holding device. In this cube-shaped holding device composed of several component parts, the permanent magnets arrangements 4 are alternately inserted in a reversed manner, so that same poles of each pole face always are aligned with each pole plate. By this means the pole plates are excited by the permanent magnet arrangements such that poles of alternating polarity always result on the adhesive surfaces 12 of the pole plates, as this is indicated in the drawing by the letters N and S. Furthermore, the front pole plate is dispensed with in that figure, so that it becomes obvious that the holding device is in switched-on position. The strongest adhesive force is achieved on the pole faces of the pole plates which are separated by the non-magnetic brass piece 8.

FIG. 3 shows another embodiment of the holding device that is assembled as a cube-shaped body. In this embodiment the front pole plate has also been dispensed with so that the magnetization of the permanent magnet arrangement 4 becomes obvious.

In this embodiment each of the plate-shaped stationary permanent magnets 1 as well as each of the turnable permanent magnets 3 are provided with four pole pairs of alternating polarity in axial direction. As it is clearly obvious from the drawing, the stationary and rotatable permanent magnets have four pole areas of alternating polarity on each pole surface. The individual pole areas are separated in the drawing by dotted parting lines (neutral zone). In the same manner the pole plates must be subdivided by non-magnetic brass pieces 8 which are arranged cross-wise. With this embodiment the holding device is switched on and off by turning through 90°.

The holding device according to FIG. 3 is also illustrated in switched-on condition. The poles resulting on the adhesive surfaces 12 of the pole plates are marked by the letters N and S.

The arrangement of the individual parts of the holding device is clearly obvious from the perpendicular axial section of FIG. 4. The individual pole plates 7 and the stationary permanent magnets 1 and turnable permanent magnets 3 are arranged one after the other in axial direction on the turning shaft 13. The turning shaft is connected with an actuating handle 14 that is supported by the shaft 13. In order to achieve a plane surface, the circumferential surfaces of the stationary magnets 1, which are arranged between the pole plates, are surrounded by a non-magnetic material 18 such as aluminum.

Figure 5:
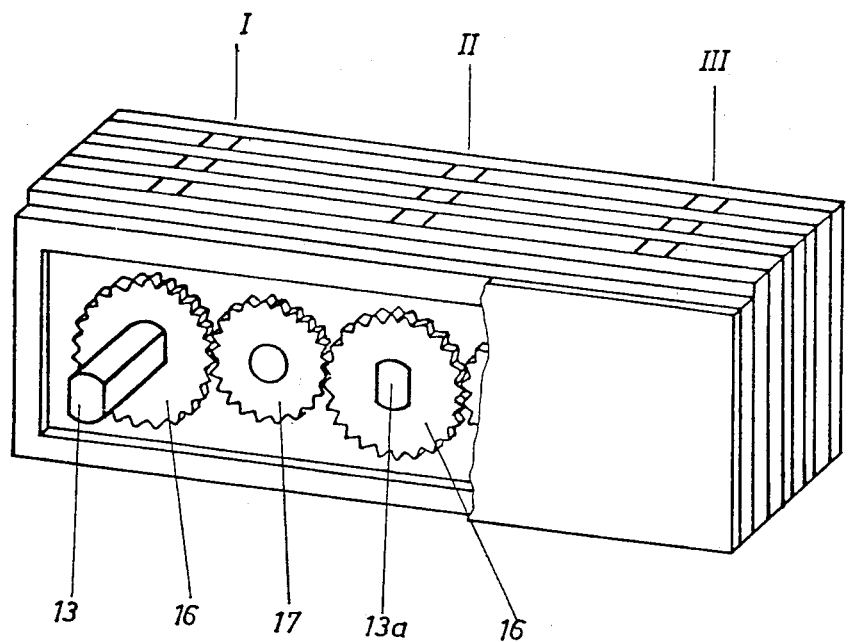

FIG. 5 is a perspective view of a holding device that is composed of a plurality of permanent magnet arrangements with pole plates according to FIG. 2 which are aligned with the pole faces of the permanent magnets, with the individual units I, II, and III being arranged side by side in perpendicular direction to the axis of rotation.

Depending on the intended use, a holding device of any length and thickness is achieved in this manner.

Switching off and on of this holding device is effected by a turning shaft 13 through an actuating handle 14 according to FIG. 4 that has been dispensed with in the drawing for reasons of a better view. In order to be able to also transmit the turning motion to the other turning shafts 13 a etc., the individual shafts are provided with toothed wheels 16 which are in gear with intermediate toothed wheels 17.

It is apparent that the holding device according to the invention is composed of simple component parts which can be assembled without any considerable manufacturing costs.

In a rational economical way the stationary and turnable permanent magnets can be made of a mixture of permanent magnet powder and a plastic binder by using the methods of injection-molding or pressing. It is within the scope of the invention to use an anisotropic permanent magnet material for the manufacture of the permanent magnets.

The invention is not limited to the embodiments referred to. It is e.g. conceivable to provide the pole faces of the front side pole plates with additional holding devices according to the invention, which are arranged rectangularly so that the result is a L- or U-shaped holding device.

What is claimed is:

1. A switchable permanent magnetic holding device for releaseably holding ferromagnetic objects, comprising at least two spaced pairs of flat at least first and second pole plates separated by a non-magnetic medium; first and second permanent magnets disposed in the space between said pairs of pole plates, said first magnet being in the form of a flat plate of permanent magnet material and having a circular opening therethrough, said second magnet being in the form of a circular disc of permanent magnet material disposed in said opening and relatively movable to said first magnet, said magnets being magnetized in a direction through pole plates and each having at least two magnetic pole pairs of opposite magnetic polarity, the pole pairs of said first magnet and said second magnet each facing a separate pole plate, the pole pairs of said second magnet in one relative position reinforcing the polarity of said first magnet and in a second position opposing the polarity of said first magnet.

2. A holding device according to claim 1, wherein the magnetic properties of the permanent magnet material used for the first and second magnets is the same and the pole face area of the second magnet is up to 10% greater than the pole face area of the first permanent magnet.

3. A holding device according to claim 1, wherein the second magnet is made of a magnetic material with a higher density of flux lines than that of the first magnet and the second magnet has a smaller pole face area than that of the first magnet.

4. A holding device according to claim 1, wherein the pole plates and the second permanent magnet are provided with a central recess and a turning shaft extends through and engages the recess of said second magnet.

5. A holding device according to claim 1, wherein there are a plurality of spaced pairs of pole plates and first and second permanent magnets are disposed in each space between adjacent pole plates with the pole pairs of the magnets in adjacent spaces being aligned.

6. A holding device according to claim 1, wherein each set of pole plates is comprised of a plurality of coplanar pole plates with adjacent pole plates separated by a non-magnetic medium and first and second permanent magnets are disposed in the space between said plates and aligned with respective pairs of pole plates.

7. The holding device of claim 6, wherein a shaft extends through each second magnet and the shafts of adjacent second magnets are interengaged by means of gears.

* * * * *

UNITED STATES PATENT AND TRADEMARK OFFICE
CERTIFICATE OF CORRECTION

PATENT NO. : 4,055,824
DATED : October 25, 1977
INVENTOR(S) : Max Baermann

It is certified that error appears in the above-identified patent and that said Letters Patent are hereby corrected as shown below:

Under the heading "FOREIGN APPLICATION PRIORITY DATA", delete the date "April 12, 1976" and substitute therefor the date "April 19, 1975".

Signed and Sealed this

Twenty-first Day of March 1978

[SEAL]

Attest:

RUTH C. MASON
Attesting Officer

LUTRELLE F. PARKER
Acting Commissioner of Patents and Trademarks